UNITED STATES PATENT OFFICE.

GIOVANNI CAPECE, OF PROVIDENCE, RHODE ISLAND.

ARTIFICIAL-STONE CEMENT.

1,103,483.  Specification of Letters Patent.  Patented July 14, 1914.

No Drawing.  Application filed December 15, 1913.  Serial No. 806,906.

*To all whom it may concern:*

Be it known that I, GIOVANNI CAPECE, a citizen of the United States, residing at Providence, in the county of Providence and State of Rhode Island, have invented a new and useful Artificial-Stone Cement, of which the following is a specification.

My artificial stone cement consists of the following ingredients, combined in the following proportions stated, viz:

| | |
|---|---|
| Beeswax | 1.80 grams. |
| Rosin | 4.30 grams. |
| Lead, powdered | 3.15 grams. |
| Brick, powdered | 2.90 grams. |
| Cement, Portland | 15.10 grams. |

These ingredients are to be thoroughly mingled by melting the beeswax and rosin and then immediately mixing the powdered lead, powdered brick and Portland cement with the melted beeswax and rosin by agitation. The ingredients are now in the form of a hot paste or in a plastic condition. For commercial use the hot paste is immediately placed in a container, such as a can or keg, in which it solidifies.

When required for use the cement is broken out of the container and heated, when it is again in a plastic condition and may be formed into various articles of commerce. The cement may be used to form the entire substance of the article or the article may be coated with the cement.

When the article to be coated with the cement is of wood, the surface of the wood is painted with white lead or lead paint and sanded before the hot plastic cement is applied. The cement when solidified adheres to the wood so that the cement and wood are practically integral. The cement hardens or solidifies in approximately five minutes and forms an extremely hard and durable body or coating which is impervious to moisture, it doesn't break or crack easily and has a dull finish.

The cement may have any color or tint desired by mixing the required color with the ingredients.

Having thus described my invention, I claim as new and desire to secure by Letters Patent:—

1. The herein described artificial stone cement, consisting of beeswax, rosin, lead powdered, brick powdered, and Portland cement, substantially as described and in approximately the proportions specified.

2. The herein described artificial stone cement, consisting of beeswax 1.80 grams, rosin 4.30 grams, lead powdered 3.15 grams, brick powdered 2.90 grams, Portland cement 15.10 grams, substantially as described.

In testimony whereof, I have signed my name to this specification in the presence of two subscribing witnesses.

GIOVANNI CAPECE.

Witnesses:
  ANTHONY V. PETTINE,
  CHAS. H. LUTHER.

---

Copies of this patent may be obtained for five cents each, by addressing the "Commissioner of Patents, Washington, D. C."